United States Patent [19]

Zittel

[11] Patent Number: 4,981,073

[45] Date of Patent: Jan. 1, 1991

[54] CUTTING APPARATUS FOR PROCESSING ELONGATED VEGETABLE PRODUCTS AND THE LIKE

[75] Inventor: David R. Zittel, Columbus, Wis.

[73] Assignee: Lyco Manufacturing Inc., Columbus, Wis.

[21] Appl. No.: 388,529

[22] Filed: Aug. 2, 1989

[51] Int. Cl.$^5$ .............................. A23N 15/12
[52] U.S. Cl. ............................ 99/636; 99/639; 99/643
[58] Field of Search ............. 99/635, 636, 637, 639, 99/643, 638, 644, 546; 366/222, 223, 225, 233; 130/30 R; 209/626, 664, 288, 396

[56] References Cited

U.S. PATENT DOCUMENTS

| | | | |
|---|---|---|---|
| 864,386 | 8/1907 | Peters. | |
| 1,038,698 | 9/1912 | Whitney et al. | |
| 1,351,143 | 8/1920 | Vaudreuil. | |
| 1,882,481 | 10/1932 | Buck. | |
| 1,897,664 | 2/1933 | Hansen. | |
| 1,969,283 | 8/1934 | Talbot. | |
| 1,990,425 | 2/1935 | Buck. | |
| 2,114,730 | 4/1938 | Urschel | 99/636 |
| 2,393,461 | 1/1946 | Finley | 99/636 |
| 2,518,598 | 8/1950 | Buck | 99/636 |
| 3,010,498 | 11/1961 | Carlson | 99/636 |
| 4,213,383 | 7/1980 | Burton | 99/644 |
| 4,528,902 | 7/1985 | Mietzel. | |

*Primary Examiner*—Timothy F. Simone
*Attorney, Agent, or Firm*—Andrus, Sceales, Starke & Sawall

[57] ABSTRACT

A cluster cutter apparatus and a snipping apparatus are similarly formed to increase the snipping efficiency of a bean processing line. Each apparatus includes a rotating drum having a circumferential slotted surface in combination with an internally elongated inclined orienting plate unit for orienting of the beans onto the lower interior periphery of the rotating drum. The plate unit may be an inclined fixed plate or a rotating paddle wheel and includes a plurality of plates which is located in the lower leading quadrant of the drum. The paddle wheel is rotated at an appropriate speed relative to the drum and contributes to a highly cost effective high volume bean processing system. The plate(s) supports the beans and provides gradual and controlled vertical transfer to the drum slots. The cluster cutter includes separating disc units to separate the clusters. A plurality of separate bean severing knife units are spaced circumferentially over the complete lower half of the drum between the two o'clock and nine o'clock positions on the drum.

22 Claims, 3 Drawing Sheets

CUTTING APPARATUS FOR PROCESSING ELONGATED VEGETABLE PRODUCTS AND THE LIKE

BACKGROUND OF THE PRESENT INVENTION

This invention relates to an apparatus for processing elongated vegetable products such as beans and the like and particularly such apparatus for processing a mass of raw beans and removing an end portion.

In the processing of beans and like products, the end of the bean is removed through a suitable automated snipping apparatus. A widely used system includes a rotating drum structure with the mass of beans moving therethrough from one end of the drum to the other end. The pheripery of the drum is a slotted member which permits projection of one end of the bean while preventing movement of the bean otherwise through the cutting slot or opening. A series of cutters is secured over a lower quadrant of the drum, generally the three to six o'clock quadrant and sever the protruding ends of the beans to discharge snipped beans with the ends removed. Generally, the mass of incoming beans are first past through a cluster cutter/presnipper having knife units to break up clusters of beans which normally are created in the collecting and delivery of the beans to the processing end apparatus. The cluster cutter/presnipper and the snipping apparatus may have the same basic snipping structure with the cluster cutter/presnipper having the internal knife units and a special construction to bring the bean clusters into the knife units.

The orientation of the bean within the drum structure of the snipping apparatus is of course significant in order to appropriately locate the beans within the slots and removal of the end. The beans rotate with the drum and drop downwardly. The beans are directed into a vertical plane such that the ends move downwardly into the slotted drum for severing by the exterior knives. Early U.S. Pat. No. 1,882,481 which issued on Oct. 11, 1932 and U.S. Pat. No. 1,990,425 which issued Feb. 5, 1935 discloses internal orienting rods located adjacent the inner surface of the drum. U.S. Pat. No. 2,393,461 which issued Jan. 22, 1946 discloses a drum with internal vanes to pickup the beans and carry them into the upper drum portion. The beans are thrown laterally to engage a vertical corrugated plate which orients the beans vertically such that the beans drop downwardly into the cutting opening. In addition, the beans are distributed over the narrow cutting area of the cutters, namely, the one quadrant of the drum. The diameter of bean processing drums is often on the order of 48 inches. A large percentage of broken, bruised and damaged beans results with present designs because the product falls a long distance at a rapid speed. Various recent systems use other means for continuously reorienting of the drums. For example, other systems use a plurality of axially spaced guide disks such that as the beans carried upwardly by the drum drop downwardly between the axially spaced disks. The spacing is such that the beans move with the principal axis directed in a diametric plane through the drum thereby reorienting of the beans and directing the end downwardly towards the slot in the lower end of the drum. Another apparatus uses an internal rotating drum having an undulated and essentially closed outer surface for moving of the beans in a very specific manner with respect to the outer rotating drum for reorienting of the beans.

Although the prior art systems have been suggested and have found commercial implementation, the complexity, cost and functioning of the apparatus does not provide an optimum bean snipping apparatus and a continuing demand for a commercially and cost effective snipping apparatus for high speed processing of a continous source of beans in a continuous manner exists.

SUMMARY OF THE PRESENT INVENTION

The present invention is particularly directed to a simple and improved bean snipper apparatus particularly adapted for removing of the ends of beans and like elongated members in a simplified apparatus permitting cost effective commercial production. In accordance with a further feature of this invention, the cluster cutter is constructed with the improvement in the snipping structure to increase the functioning of its snipping structure for snipping some of the beans passing therethrough As defined herein, the terminology bean snipper threfore generally includes both a cluster cutter having the bean snipping structure and function as well as an apparatus which sole function is bean snipping. Where the cluster cutter is specifically being described or defined, the terminology cluster cutter is used. The apparatus, particularly in the combination of the novel cluster cutter and the bean snipper, provides a particularly high capacity processing with excellent quality of beans on a continuous or batch processing. Generally, in accordance with the teaching of the present invention, a rotating drum is provided with a circumferentially slotted surface in combination with an internally elongated inclined orienting plate-like structure for continuously circulating and orienting of the beans onto the lower interior periphery of the drum. The orienting structure may be a simple inclined plate located toward the lower leading quadrant of the drum. In one orienting unit, a rotating paddle wheel includes a plurality of plate-like members and is rotatably located in the lower leading quandrants. The rotating paddle wheel supports the beans and provides gradual and controlled vertical transfer to the openings of the drum. In addition, in accordance with another teaching of the present invention, a plurality of separate bean snipping or severing knife units are spaced circumferentially over substantially the complete lower half of the drum, and preferaly between the two o'clock and the nine o'clock positions on the drum, and provide an extended operative cutting surface inclusive of the both lower quadrants of the drum. The inventor has found that the internal inclined orienting structure provides a simple, reliable and effective device for distributing of the rotating beans as they move upwardly into the upper portion of the drum and then return downwardly onto the lower portion of the drum. The paddle wheel structure is a simple apparatus and provides for a structurally low cost and effective unit which can be readily and effectively incorporated into the drum structure without significant variation in the drum surface. In addition, the extended distribution of the cutting knives from a single lower quadrant of the drum to essentially both lower quadrants significantly increases the effectiveness and productivity of the drum thereby contributing to a highly cost effective high volume processing.

The cluster cutter apparatus is uniquely constructed in accordance with the teaching herein with a bean orienting unit and snipping knives generally in accordance with the structure of the bean snipping apparatus and serves to snip a limited percentage of the beans as the clusters of beans are separated for passing to the downstream snipping apparatus.

The combination of the special cluster cutter and the snipping apparatus produces a dramatic increase in the snipping efficiency of the processing apparatus. Either the cluster cutter or the snipper may of course be advantageously used for other existing designs to increase the snipping efficiency and/or the quality of the final processed bean or the like.

DESCRIPTION OF THE DRAWING FIGURES

The drawings furnished herewith generally illustrate the best mode presently contemplated for the invention and are described hereinafter.

DESCRIPTION OF THE ILLUSTRATED EMBODIMENT

Figure 1:
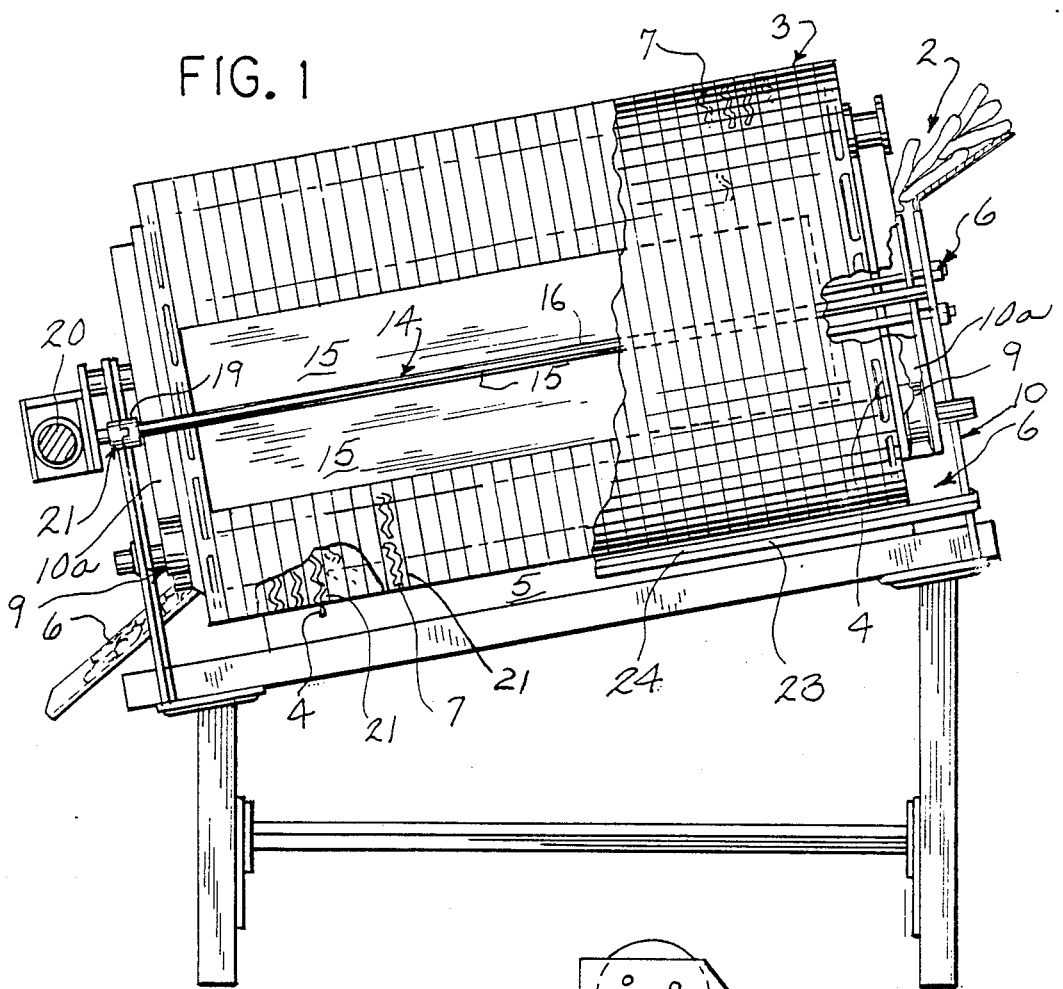
FIG. 1 is a side elevational view of bean snipping apparatus including a snipping drum incorporating the teaching of the present invention with parts broken away and sectioned.
Figure 2:
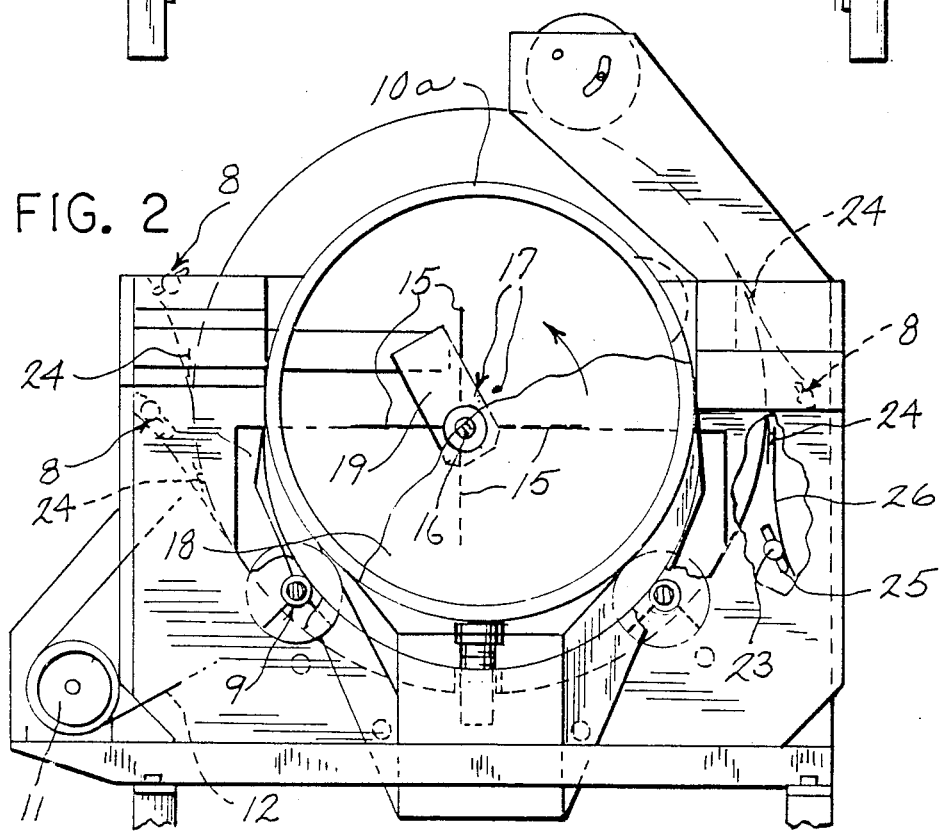
FIG. 2 is an end view of the bean snipping apparatus of FIG. 1.

Referring to the drawings and particularly to FIGS. 1 and 2, a bean processing apparatus 1 is illustrated passing a mass of separated beans 2 through a bean snipper apparatus 3, incorporating a bean orienting and supporting structure in accordance with a teaching of the present invention. The separated beans 2 are fed into the one end of a drum 5 and discharged from the opposite end as a mass of snipped beans 6. The beans 2 are vertically oriented with the one end 4 of the beans 2 passing through cutting slots or openings 7 in the surface of the drum 5. A plurality of knife units 8 are secured abutting the surface of the drum 5 and serve to snip the ends 4 of the beans 2 from the bean. The illustrated embodiment includes nine sets of knife units 8 extended across the drum between the two o'clock and the nine o'clock positions on the drum to establish a preferred unique and optimum cutting of the bean ends.

The drum 5 typically consists of a plurality of drum sections, not shown, interconnected to each other to form a smooth outer surface in accordance with known design. Each section includes one or more of the openings 7 for exposing the end of beans 2. The individual sections are secured to each other and to end frames to provide a self-supporting integrated drum assembly. The drum 5 is rotatably mounted in a support stand 9a. Rotary bearing wheel units 10 are secured within U-shaped bearing supports 10a which encircle the lower end of the drum 5. The U-shaped supports 10a are located at the ends of the support stand 9a and the end frames of the drum 5 are provided with corresponding complementing bearing ring members 10a journaled on the bearing units 9 to provide a low friction support for the rotating drum structure. The support legs of stand 9a are of different lengths to tilt the drum 5 downwardly from the open entrance end to the open discharge end with the mass of beans 2 then moving by gravity to the discharge end. A drive motor 11 is shown mounted to the lower or bottom of the support structure and is coupled through a suitable belt 12, coupled to drum 5, such as more fully shown in FIG. 6, to drive drum 5 in accordance with known systems. The drum 5 is thus rotated at an essentially constant speed with the beans 2 moving upwardly with the drum 5 along the leading surface of the drum and then falling downwardly to the lower apertured portion. In dropping downwardly, the stalk end of the bean 2 tends to gravitate downwardly into a vertical orientation such that the end moves downwardly through an aligned cutting opening 7.

In accordance with the illustrated embodiment of the present invention, a paddle wheel orienting unit 14 is mounted within the drum 5 to assist in the vertical orientation and direction of the beans 2.

In the illustrated embodiment of the invention, the paddle wheel unit 14 includes four equispaced paddles 15 secured to a rotating shaft 16. The paddles 15 thereby are rotated within the drum 5 and rotate generally in the same direction as the drum. Each paddle 15 is a flat plate-like member secured to the rotating shaft 16. The width of the paddle 15 substantially corresponds to the internal length of the drum 3. The radial length of the paddle 15 is significantly less than the radius of the drum 5.

In operation, the relatively large mass of beans 2 moves axially through the drum 5. The rotation of the drum 5 picks the mass of beans 2 upwardly and moves them into the upper half of the drum. The speed of the drum 5 is such that the beans are readily lifted but is insufficient to hold the beans within the upper end of the drum. Throughout the upper end of the drum 5 and particularly the downstream end, the beans 2 drop downwardly toward the lower two quadrants of the drum. In moving downwardly, the beans 2 engage the paddles 15 of paddle unit 14, which support the beans after a relatively short drop, assist in breaking up the mass of beans and cause the beans to move downwardly at an appropriate rate, with the beans 2 oriented in a more or less vertical orientation. Beans 2 drop may downwardly to the opposite sides of the paddle unit 14. The latter beans are not falling a great distance and are vertically oriented with the end of the beans moving into an aligned cutting opening 7 for severing by a knife unit 8. During the complete travel of a bean 2 from one end of the drum to the other, the bean has its end passed through at least one opening, with the end removed. Of course, once the end is removed, the size of the bean end prevents further movement through the openings during any subsequent movement and thereby result in the appropriate retention of the main body.

The plurality of knife units 8 and the location of the knife units 8 over the complete lower 180 degrees or both lower quadrants of the drum and the significant number of circumferentially spaced sets of knives has been found to dramatically increase the snipping efficiency in both cluster cutters and snippers, as compared to all other methods, and to result in a highly effective, reliable, bean/snipper apparatus with high quality beans being discharged.

The present invention is particularly directed to the internal orienting structure 14 and the unique distribution of the multiple knife sets 7 to provide an improved bean snipper apparatus. The drum structure and its support as well as the drive therefore may be of any known or other suitable construction and no further description thereof is given other than as necessary to clearly understand and explain the present invention.

The illustrated orienting structure 14 of the first embodiment includes the paddle wheel structure 14 which is specially located slightly off-center from the center of the drum 5, as shown at 17 in FIG. 2 and with the outer end of the paddles always spaced from the periphery of the drum 5. The paddle wheel 14 is specially rotatably located with its axis of rotation slightly off-center from the drum center or axis of rotation in both the vertical and horizontal directions, thereby providing a somewhat smaller spacing between the leading lower drum quadrant 18 shown to the left side of the drum structure in FIG. 2.

The illustrated paddle wheel structure 14 includes the four equispaced paddles 15 secured to the rotative shaft 16 which extends from the drum. The opposite ends of the shaft 16 are journaled within the end frame, as at 19, of the U-shape support. A small motor 20 is mounted to the supporting structure and is releasably coupled as by a typical slotted coupling 21 to the adjacent end of the shaft. The paddle wheel 14 is thus driven within the main drum 5. In a preferred construction, the drum 5 and the paddle wheel 14 are rotated in the same direction and at essentially equal speeds.

The drum is formed of a relatively large diameter typically and often 48 inches. The beans have a relatively large drop factor or distance. The paddles 15 serve to cushion the beans to minimize any damage or breakage to the bean proper while assisting and promoting the drop off of the beans into the outer drum for passage into the openings. The paddles 15 serve to further distribute the beans, with the beans falling from the surface of each paddle 15 as it moves through the leading quadrant 18. The beans 2, which drop between the paddles 15 and the outer drum 5, drop downwardly onto the upper portions of the lower cutting half of the drum. The portion of the beans 2 to the opposite sides of the paddle structure 14 in falling downwardly have a relatively shorter fall distance and thus the danger of damage is significantly minimized.

The separate paddle motor permits rotating the paddle wheel at a different speed than the drum and may thereby be related to the feed rate of the beans and other factors. The independent rotation control of the drum and the paddle thus permits optimum orientation of the beans for maximum through-passage of the beans without lost of quality. The beans are thereby distributed by the drum and paddles as the beans move axially through and with the rotating drum to improve the distribution and location of the beans within the structure.

Generally, the drum 5 may rotate on the order of 22 RPM such that with a continous 50% filling of beans, the drum appears to operate with a large mass of beans rotating continously at a relative high speed. The speed however of the bean proper is such that it readily moves downwardly into the lower half of the drum under the appropriate gravity forces. A simple paddle structure promotes and permits the convenient dropping of the beans and particularly provides a very assured means of having the beans move from the directional or orienting structure into the cutting openings of the main drum.

More particularly in the illustrated embodiment of the invention, the surface of the drum 5 is formed in accordance with known practice, of appropriate relatively small sections which are interconnected to each other to effectively provide an essentially smooth outer surface drum. The drum 5 includes the plurality of circumferentially extended and like openings 7 spaced laterally or axially from each other, generally by a distance slightly greater than the width of the cutting openings. The inner face of the drum 5 is formed with circumferential grooves inclusive of the openings 10 and having tapered sidewalls 21 to form directional surfaces directing the bean ends downwardly through an aligned opening 7. The openings in accordance with known practice can be simple, straight openings (FIG. 2a) but are preferably formed having a serpentine or laterally undulating configuration, as shown in FIGS. 1 and 2b.

Figure 2C:
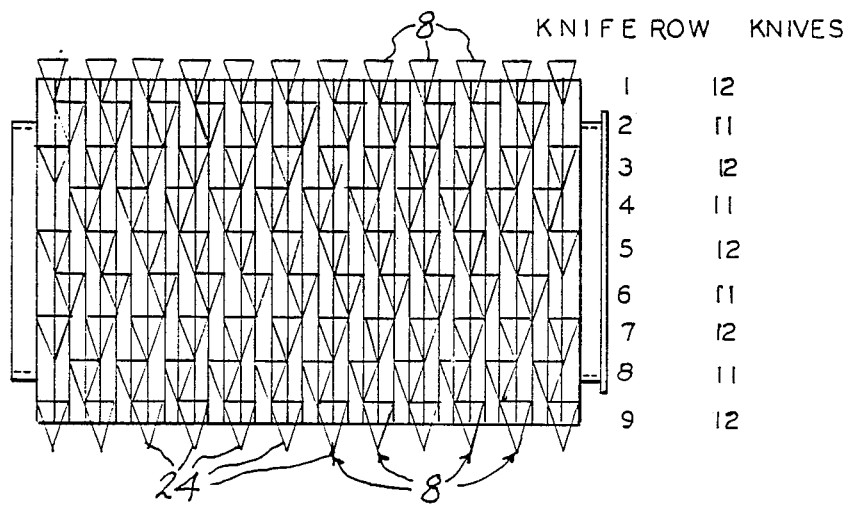
FIG. 2c is a schematic view of a plurality of knife units on the snipper drum shown in FIGS. 1 and 2.
Figures 2A, 2B, 4:
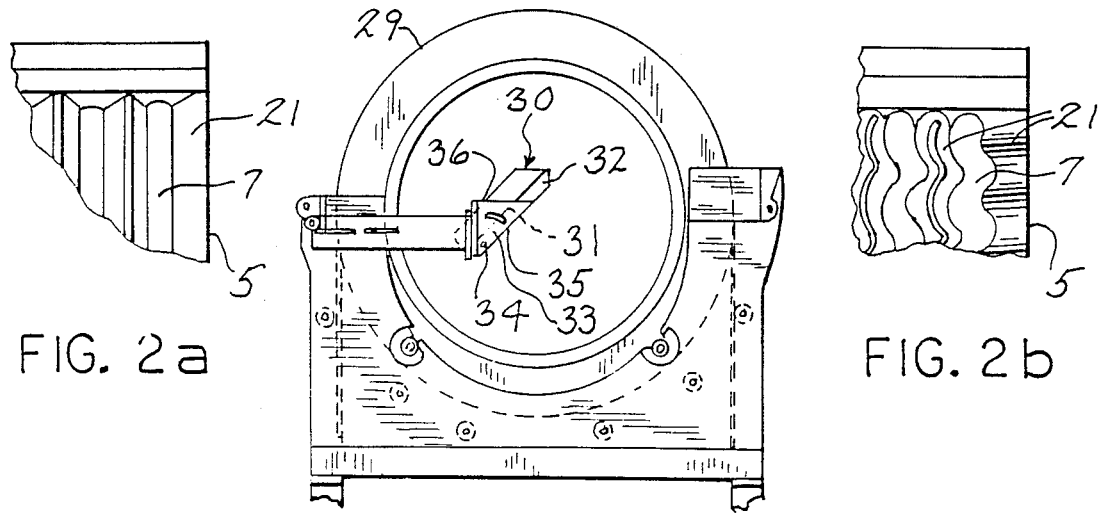
FIG. 2a and 2b are fragmentary view of drum slots.
FIG. 4 is an end view of FIG. 3.

Each knife set or unit 8 may be constructed in accordance with known construction and are only shown in FIGS. 2 and 2a. Each unit 8 includes an appropriate support rod or shaft 23 secured between the end frames of the support unit. The knife unit 8 in accordance with conventional practice may include a V-shaped cutting blade 24 secured to a flexible arm 26, the outer end of which is secured by a support member 25. The support member 25 is rotatably secured to rod or shaft 23 and the knife blade 24 projects vertically and inwardly into bearing engagement with the smooth surface of the drum 5 with the bearing force set by the angular setting of the support members. The supports 25 are set to deflect the blades 24 and are preferably set to create a low force engagement such as typically 4 to 9 pounds. Each of the knife units 8 is secured in circumferentially spaced relation to the other units 8 with its cutting edge in firm sliding engagement with the surface of the drum and preferably slightly more than 180 degrees. In the illustrated embodiment of the invention, the knife sets 8 span substantially 180 degrees of the drum and preferably slightly more than 180 degrees. The beans protruding from the drum within any part of the lower half of the drum are cleanly and completely severed and drop downwardly into a suitable or waste product receiving unit or the like, not shown.

In a practical application, the knife units were placed over about 210 degrees, between the two o'clock position and the nine o'clock position as shown in FIG. 2. The knife units 8, as schematically shown in FIG. 2c are located in nine axial rows, with alternate rows having 12 and 11 knife units 8 respectively, with 12 knife units 8 in the first and last rows. Thus 104 knife units cover the drum.

The knife structures and their support may be of any suitable construction and various well known systems are available and may be used. A significant aspect of the teaching of the present invention however is the very substantial number of knife sets provided spanning at least 180 degrees of the main drum, and preferably slightly more than 180 degrees.

Figure 3:
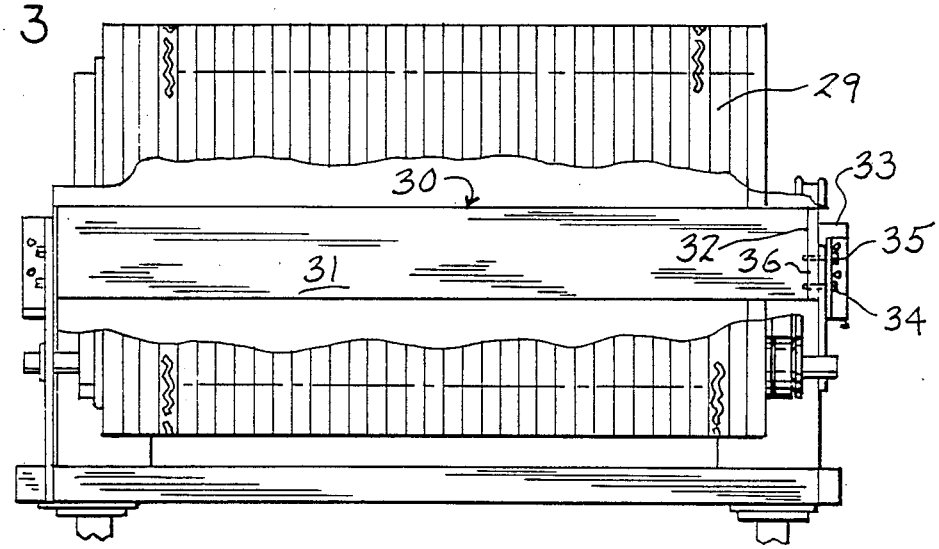
FIG. 3 is a view similar to FIG. 1 illustrating a fixed bean orienting apparatus in accordance with the present invention.

Although the multiple vaned paddle structure or wheel 14 provides highly satisfactory and effective results, a simplfied structure can be provided wherein a simple deflector plate is located within the drum, and mounted in fixed orientation within the drum. A satisfactory structure is illustrated in FIGS. 3 and 4. The outer drum 29 may be constructed in accordance with any desired construction, and is shown similar to that previously described and illustrated. In this second embodiment, the bean orienting structure 30 is shown inclusive of a single baffle plate 31 mounted within the drum 29. The baffle plate 31 is a flat rigid member secured within the drum, and offset from the center of the drum, generally as the offset centering of the rotating paddle wheel, to locate the plate 31 into the lower lead quadrant of the drum. The plate 31 includes mounting end flanges 32 at the opposite end and pivotally mounted to the support structure. A pivot pin bracket 33 is secured to the U-shaped support and projects into overlapping relation with the flange to pivotally support the baffle plate 31. The bracket 33 is a plate-like member located with the bearing ring member and abutting the flange 32. A first pin 34 couples the flange 32 to the bracket to pivotally mount the plate 31. A second locking pivot pin 35 passes through a slot 36 in the brackets and into the flange. The slot 36 in the outer bracket is an accurate slot which permits pivoting the attached flange and baffle plate 31.

The plate 31 is optimumly placed at a 45 degree angle to the horizontal end with the lower end of the plate 31 located in closest spacement to the periphery of the drum 29 immediately adjacent to the upstream quadrant in the lower half of the drum, as in the first embodiment. Other angles may be used depending upon the state of the product, the speed of the product movement and the like.

The second embodiment operates in a manner similar to the first embodiment. Thus, the drum rotates the beans 2 which moves upwardly into the upper half of the drum. The greater portion of the beans move laterally to the front of the drum and then drop downwardly onto the baffle plate 31 and between the baffle plate and the drum. In moving downwardly, the inclined baffle plate 31 breaks the fall of the beans and serves to disrupt the mass of the beans to assist in vertical orientation as the beans move downwardly into engagement with the slotted drum and the knife units.

Figure 5:
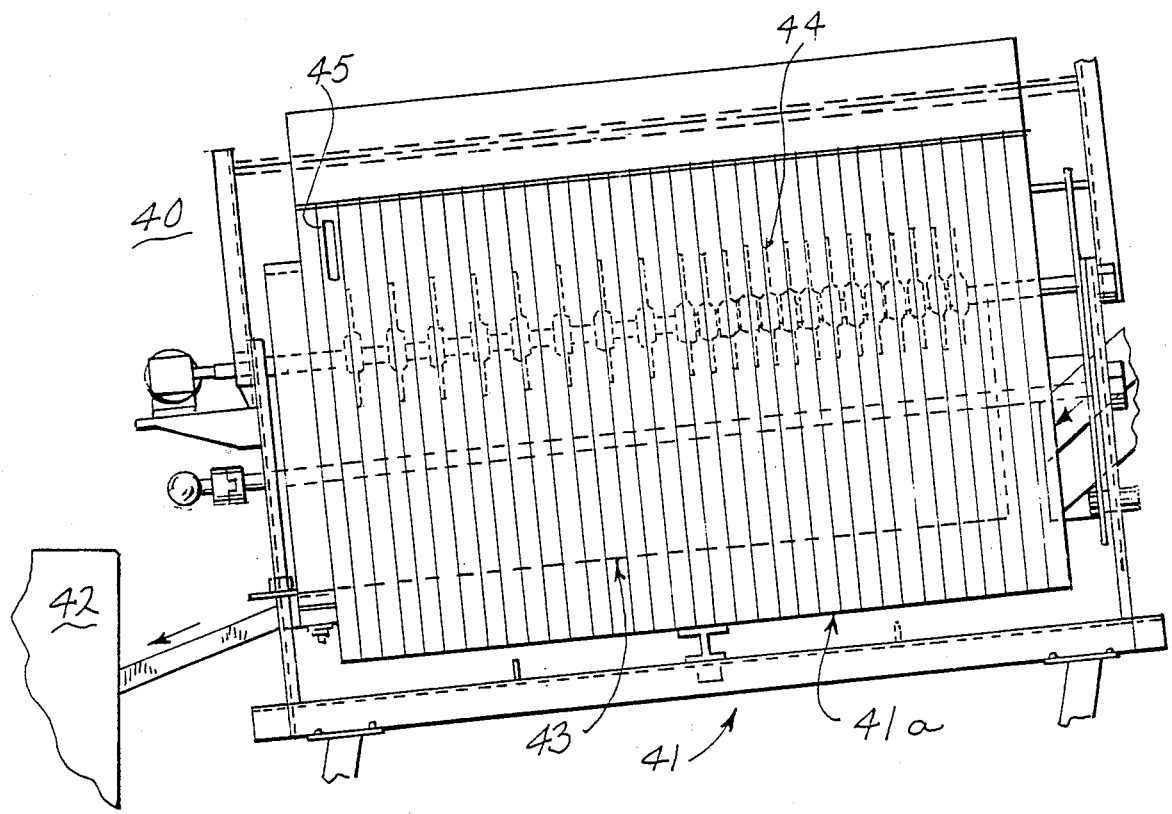
FIG. 5 is a view illustrating a fresh bean processing apparatus including a bean cluster cutter apparatus and a bean snipping apparatus.

In the processing of beans, as previously noted, the beans are received for processing as a mass of interwoven elongated beans including clusters of beans. Prior to snipping of beans, the clusters are separated in the decluster cutter apparatus, which is constructed to also snip a significant portion of the separated beans. The decluster cutter apparatus is advantageously modified in accordance with the teaching of the orienting and supporting structure of the present invention. A typical example is illustrated in FIG. 5. The basic rotating drum and its structure including the drum drive of the cluster cutter preferably correspond to that of the bean snipping apparatus such as shown and described above.

Figure 6:
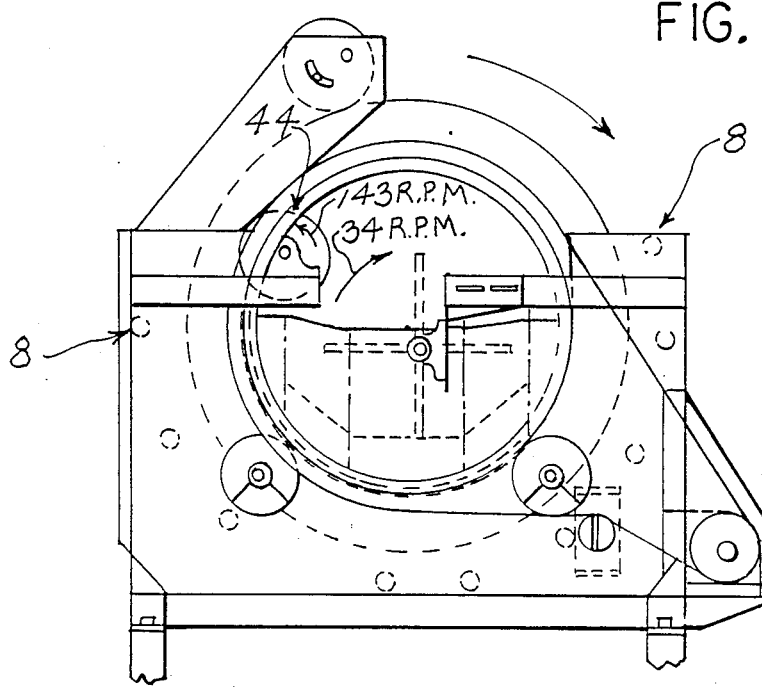
FIG. 6 is an end view of the cluster cutter of FIG. 5.

Referring to the drawings and particularly to FIGS. 5 and 6, a bean processing apparatus 40 is illustrated including a decluster cutter apparatus 41 in combination with a downstream bean snipper apparatus 42 for processing of whole beans is shown. Although the present invention as shown in FIGS. 5 and 6 may incorporate any bean snipper apparatus 42, the bean snipping apparatus preferably incorporates the teaching of the present invention such as shown in the prior illustrated embodiments. In accordance with the further teaching of this invention, the presnipper and decluster cutter apparatus 41 incorporates a rotary drum structure 41a shown substantially identical to that previously described for the bean snipping apparatus and incorporating a bean orienting and supporting structure 43 constructed in accordance with the teaching of the present invention. The bean oriented and supporting structure 43 is illustrated as a rotating paddle structure corresponding to the first embodiment.

As most clearly shown in FIG. 5, the decluster cutter apparatus includes a plurality of axially spaced cluster cutting discs 44, mounted in the upper left quadrant of the drum as viewed in FIG. 6. Cluster cutting discs 44 are well known and have been widely used in declustering drum structures.

The shape of the bean slots 45 formed in the wall of the rotating drum are also different. The cylinder includes a similar number of the plastic segments, each of which includes a circumferential slot. In the case of the decluster apparatus, however, each slot 45 is formed by a circumferentially straight pocket and opening. The wavy pocket and slots, as used in the bean snipper apparatus, are generally considered as producing improved snipping because the wavy slot provides more corners for catching of the end of the bean and directing it downwardly through the opening. The straight pockets and slots are desirable in the pre-snipper and decluster cutter apparatus because the straight pockets will allow the stems and debris to more readily pass through the slots. Thus, the decluster apparatus functions to appropriately separate the beans as well as to snip the separated beans. The snipping of beans in the decluster cutter apparatus provides a highly increased efficiency in the overall apparatus.

As shown in FIG. 5, the cutter discs 44 are axially distributed, in accordance with past practice, downstream of the first three pocket members which are free of cutter discs. The cutter discs are then aligned with each of the pocket units for a approximately 14 segment or pocket units and thereafter, are located with every other pocket unit. This allows a relatively high efficient flow of beans and presnipping of some of the beans. Thus, the particular arrangement is based on recognizing the characteristic of the beans and the bean clusters and the fact that after being substantially separated, bean mass can be finally separated by the more widely spaced cutters. The distribution shown is therefore not critical but has been found to provide a highly satisfactory result in a commercial bean processing apparatus.

The cutter disc 44 are located in the upper left quadrant of the rotating drum as viewed from the infeed end in FIG. 6. The discs are located in relationship to the paddle to permit a free rotation of the discs and paddle unit with a slight spacing between the peripheral surfaces at the location of mutual passage.

The mass of beans 46 is carried into the raised end of the cluster cutter apparatus 41. The beans 46 in passing through the cutter apparatus move upwardly with the drum into the area of the cutter discs 44 which separate the mass of beans to establish a more individual movement of the beans downwardly through the drum structure. The masses or clusters of beans are separated in passing through the drum and are discharged as essentially a free flow of individual beans for transfer and passage into the snipping apparatus 42.

In the combination of the present invention, the beans moving through the decluster cutter apparatus 41 are supported and distributed by the rotating paddle unit 43. However, in the decluster cutter apparatus, the edges of each paddle 47 includes a series of spaced notches 48. Each notch 48 is preferably a rectangular notch having a width of about ¾ inch and a depth of about 3/16 inch. Although, the notch size is not critical, the notched paddles 47 serve to pick up the bean clusters and move them into and through the separating disc 44. The individual beans are separated and vertically oriented with the one end of a limited number of the declustered beans passing through the cutting slots or opening in the surface of the drum. The rotating paddle units thus serves to both carry the bean clusters into the disc and to align and support the separated beans.

As in the snipping apparatus, a plurality of knife units 50 are secured dispersed over the lower half of the drum and preferably 104 knife units are arranged between the two and nine o'clock position as schematically shown in FIG. 2c. The knife units serve to snip the ends of beans prior to the discharge of the mass of beans and passage into the snipping apparatus for final processing of the beans.

The knives on the decluster unit are preferably identical in number and location to the knife arrangement provided on the previously described bean snipper.

In the decluster apparatus 41, the drum 41a may typically rotate at 26 RPM with the supporting paddle structure rotating at 34 RPM. The cutter discs rotate in the opposite direction from that of the drum and the paddle unit and at a rate of 43 RPM. In the preferred construction of the present invention as described, efficiencies of 75% in the decluster cutter are common and much higher efficiencies have been obtained. This thus reduces the load requirement on the snipping apparatus 42 and allows very significant increases in the precentage of snipped beans and the quality of the beans. For optimum results, the bean processing apparatus preferably includes the decluster apparatus with the improved bean orienting and support apparatus in combination with a snipping apparatus including a similar bean orienting and support apparatus.

The above changes including the knife units and the orienting apparatus preferably constitute the only modifications in the construction of the drum of the decluster cutter apparatus and the bean snipper apparatus. Although it is difficult to quantify a bean quality of the snipped beans, there was a distinct and material improvement in the quality of beans as delivered from the snipping apparatus.

The distribution and increased number of knives used in both the decluster cutter apparatus and the snipping apparatus resulted in a distinct improvement in the overall snipping efficiency. Thus, the decluster apparatus had an increase in snipping from approximately 60% to 75% efficiency and, in some instances, even an efficiency of as high as 90% was encountered. In any event, the general 15% increase is highly significant in the processing of beans.

The snipping apparatus showed a further improvement. Although 95% efficiency are expected with current design, the new design of this invention increased the bean snipping efficiency to a level of 99.4%. This increase must be considered a very dramatic and significant increase particularly when combined with an improved quality product.

Various modes of carrying out the invention are contemplated as being within the scope of the following claims particularly pointing out and distinctly claiming the subject matter which is regarded as the invention.

I claim:

1. A bean snipping apparatus for removing of the end of a bean, comprising
   a rotating drum including a plurality of circumferentially extended slots having an axial length adapted to allow only the end of the bean to protrude through the slot, said drum mounted for rotation on a substantially horizontal axis and having an upper half and a lower half,
   means for feeding beans through the drum and propelling the beans through the drum,
   said rotating drum continuously carrying beans upwardly from the lower half of the drum and dropping the beans downwardly from the upper half of the drum to the lower half of the drum,
   an inclined plate-like member within said drum, said inclined plate-like member including a planar surface projecting axially and longitudinally of the drum and operable to support and orient the beans falling downwardly from the upper half of the drum, and
   a plurality of individual knife units distributed over the complete lower half of the drum to snip the protruding ends of the beans.

2. The apparatus of claim 1 including a fixed support for said plate-like member, said fixed support holding the plate-like member in fixed orientation within the drum during rotation of the drum.

3. The apparatus of claim 2 wherein said fixed support includes an adjustable coupling for changing the inclined angle of said plate-like member.

4. The apparatus of claim 2 wherein said plate-like member is set at an angle of 45 degrees to the horizontal.

5. The bean snipping apparatus of claim 1 including a rotating paddle wheel structure having an axis of rotation, said inclined plate-like member and a plurality of other plate-like members being interconnected to form a part of said paddle wheel structure and circumferentially spaced about said axis of rotation, each said plate-like members being periodically located in the lower portion of the drum as said inclined plate-like element to support and orient beans falling from the upper portion of the drum.

6. The apparatus of claim 5 wherein said axis of rotation is offset downwardly from the center of the drum.

7. The apparatus of claim 6 wherein said axis of rotation is offset upstream of the rotation of said drum.

8. The apparatus of claim 5 wherein said knife units are located in axial rows and circumferential columns and include knife units substantially throughout the lower half of the drums.

9. The apparatus of claim 5 wherein said knife units are distributed substantially between the two o'clock and nine o'clock positions on the circumference of said drum and said plurality of knife unit circumferentially are spaced throughout the drum between said two o'clock and nine o'clock positions.

10. The apparatus of claim 1 wherein said knife units are located in axial rows and circumferential columns and include knife units substantially throughout the lower half of the drums.

11. The apparatus of claim 1 wherein said knife units are distributed substantially between the two o'clock and nine o'clock positions on the circumference of said drum and said plurality of knife units being circumferentially spaced throughout the drum between said two o'clock and nine o'clock positions.

12. The apparatus of claim 11 wherein about 104 knife units are distributed in nine circumferentially spaced rows including five rows of twelve knife units and four rows of eleven knife units.

13. The apparatus of claim 8 wherein said shaft is offset from the center of rotation of said drum and is located within the upstream lower quadrant of said drum whereby the edge of each paddle moves through said upstream lower quadrant in relatively close spaced relation to said drum in comparison to all other quadrants of said drum.

14. A rotating drum bean snipper comprising a support structure, an outer drum member mounted to said support structure for rotation on a substantially horizontal axis of rotation with a lower half and an upper half of the drum and having a plurality of axially spaced and circumferentially extended openings, said openings being selected and adapted to receive the end of the bean while maintaining the support of the main body of the bean, means for rotating said drum to carry the beans from the lower half of the drum upwardly into the other upper half of the drum, said beans falling downwardly from the upper half of the drum into the lower half of the drum, the ends of the beans moving downwardly into the said slots and protruding outwardly, and an inclined orienting member located substantially in the upstream lower quadrant in spaced relation to the cutting drum, said orienting member is a plate, and having an adjustable support for said plate secured to said support structure for adjusting the angle of said plate.

15. A rotating drum bean snipper comprising a support structure, an outer drum member mounted to said support structure for rotation on a substantially horizontal axis of rotation with a lower half and an upper half of the drum and having a plurality of axially spaced and circumferentially extended openings, said openings being selected and adapted to receive the end of the bean while maintaining the support of the main body of the bean, means for rotating said drum to carry the beans from the lower half of the drum upwardly into the other upper half of the drum, said beans falling downwardly from the upper half of the drum into the lower half of the drum, the ends of the beans moving downwardly into the said slots and protruding outwardly, and an inclined orienting member located substantially in the upstream lower quadrant in spaced relation to the cutting drum, said orienting member is a paddle wheel having a plurality of substantially radial plate-like members, a first drive unit is provided for rotating of said main drum, a second drive unit is provided to rotate said paddle wheel independently of said drum whereby the rotation of said drum and said paddle wheel can be optimized for passage of beans through said drum.

16. A rotating drum bean snipper apparatus comprising a rotating drum having an outer surface with circumferential openings to receive the end of a bean and having the opposite ends of the drum defining a bean inlet end and bean discharge end respectively, said drum rotating about an inclined substantially horizontal axis and having a lower half and an upper half, a plurality of cutting knife sets secured to the exterior of said drum, said knife sets including a knife unit spanning the drum and coupled to engage each of said slots, said knife sets being circumferentially spaced and located substantially over the complete lower half of said drum and including a knife set at each end of the lower half of the drum and a plurality of intermediate knife units distributed throughout the lower half of the drum, bean declustering knife units mounted within the upper end of said rotating drums, a rotating paddle wheel secured within said drum and including four equicircumferentially spaced paddle members, each paddle members having a continous plate like member essentially extending throughout the length of the drum, the outer edge of each paddle member being notched to carry the mass of beans upwardly into the separating knife units.

17. The apparatus of claim 16 wherein each projects radially from the supporting shaft, said supporting shaft being rotatably mounted at the opposite ends.

18. In combination, a bean decluster cutter apparatus and a bean snipper apparatus for processing a mass of interwoven elongated beans including separate interwoven clusters of beans
said bean snipper and said decluster cutter apparatus each comprising an inclined rotary drum mounted on a substantially horizontal axis and having a lower half and an upper half and having an upper bean infeed end and a lower bean discharge end, said decluster cutter apparatus including a plurality of cluster cutter units mounted within said drum and axially spaced therein for engagement with the mass of beans rotating about and with the drum for separating of said interwoven clusters of beans and establishing a relatively loose mass of beans at the discharge end, said clusters of beans in said mass of beans being progressively separated as the mass of the beans moves through said decluster cutter apparatus, each of said drums having a plurality of spaced circumferentially extended slots axially spaced over the surface of said drum and adapted to permit projection of an end of a bean while preventing movement of the bean body therethrough, and each of said decluster cutter apparatus and said bean snipper apparatus including a bean support and orienting plate-like unit mounted within said corresponding drum and extending axially and along the drum and inclined downwardly from the horizontal to the discharge end of the drum in the path of the beans falling downwardly from the infeed end of the drum and serving to reduce the fall rate of the beans and assisting in the vertical orientation of said beans for movement into and from the slots in the lower half of said drum, and a plurality of knife units secured to the exterior of each drum for severing of beans projecting through said slots to discharge a mass of separated and snipped beans, and said bean snipper apparatus being located downstream of said decluster cutter apparatus to receive said separated and snipped beans and a lower discharge end for discharging of fully snipped beans.

19. The apparatus of claim 18 wherein said slots in said decluster cutter apparatus being straight walled slots and in said snipper apparatus being serpentine walled slots of a size and orientation to permit the ends of unsnipped beans to project outwardly through the slot.

20. In the combination of claim 18 wherein said drum in said bean decluster cutter apparatus rotates at a speed of about 26 RPM, and said bean support and orienting plate-like unit of said decluster cutter apparatus includes a plurality of plate members and a shaft journaled within the drum of said bean decluster apparatus, and a drive unit coupled to rotate said shaft of said plate-like unit at about 34 RPM.

21. The combination of claim 20 wherein said drum of said bean snipper rotates at a speed of about 22 RPM and said plate-like unit of said bean snipper includes a plurality of plate members and a shaft journaled within the corresponding drum, and a separate drive unit coupled to rotate said shaft of the corresponding plate unit at 22 RPM.

22. The apparatus of claim 20 wherein each of said plate-like units includes a flat plate, and a support secured to the plate and holding the plate in fixed orientation within the drum during rotation of the drum, and said fixed support includes an adjustable coupling for changing the inclined angle of said plate-like member.

* * * * *

UNITED STATES PATENT AND TRADEMARK OFFICE
CERTIFICATE OF CORRECTION

PATENT NO. : 4,981,073
DATED : January 1, 1991
INVENTOR(S) : David R. Zittel

It is certified that error appears in the above-identified patent and that said Letters Patent is hereby corrected as shown below:

Claim 8, column 10, line 39, delete "5" and substitute therefor -- 1 --;
Claim 9, column 10, line 43, delete "5" and substitute therefor -- 1--; Claim 10, column 10, line 49, delete "1" and substitute therefor -- 5--; Claim 11, column 10, line 53, delete "1" and substitute therefor -- 5--; Claim 12, column 10, line 59, delete "11" and substitute stherefor -- 9 --; Claim 13, column 10, line 63, delete "8" and substitute therefor -- 12 --.

Signed and Sealed this

Eighth Day of December, 1992

Attest:

DOUGLAS B. COMER

*Attesting Officer*   *Acting Commissioner of Patents and Trademarks*